(12) United States Patent
Batchelder et al.

(10) Patent No.: US 10,889,044 B2
(45) Date of Patent: Jan. 12, 2021

(54) METHOD OF PRINTING PARTS IN A LAYERWISE MANNER WITH ONE OR MORE INTERNAL WOVEN PANELS UNDER TENSION

(71) Applicant: Stratasys, Inc., Eden Prairie, MN (US)

(72) Inventors: J. Samuel Batchelder, Somers, NY (US); S. Scott Crump, Wayzata, MN (US)

(73) Assignee: Stratasys, Inc., Eden Prairie, MN (US)

( * ) Notice: Subject to any disclaimer, the term of this patent is extended or adjusted under 35 U.S.C. 154(b) by 232 days.

(21) Appl. No.: 16/245,710

(22) Filed: Jan. 11, 2019

(65) Prior Publication Data
US 2020/0223121 A1 Jul. 16, 2020

(51) Int. Cl.
*B29C 48/30* (2019.01)
*B29C 48/05* (2019.01)
(Continued)

(52) U.S. Cl.
CPC .......... *B29C 48/3001* (2019.02); *B29C 48/05* (2019.02); *B29C 64/209* (2017.08);
(Continued)

(58) Field of Classification Search
CPC ..... B29C 48/3001; B29C 48/05; B29C 48/92; B29C 48/02; B29C 64/209; B29C 64/106; B29C 64/118
See application file for complete search history.

(56) References Cited

U.S. PATENT DOCUMENTS 5,503,785 A 4/1996 Crump et al.
6,004,124 A 12/1999 Swanson et al.
(Continued)

FOREIGN PATENT DOCUMENTS

KR 101210358 B1 * 12/2012

*Primary Examiner* — Joseph S Del Sole
*Assistant Examiner* — Mohamed K Ahmed Ali
(74) *Attorney, Agent, or Firm* — Westman, Champlin & Koehler, P.A.

(57) ABSTRACT

A method of producing a part printed in a layer-wise manner includes providing a pre-fabricated starter piece with a first course of loops and printing a layer of a part by extruding one or more flowable thermoplastic materials about the existing course of loops such that an upper surface of the layer is at a selected height on the existing course of loops. The method includes knitting a next course of loops to the existing course of loops to form a portion of an internal woven reinforcement network, and printing a next layer of the part by extruding one or more flowable thermoplastic materials about the next course of loops such that an upper surface of the next layer is at a selected height on the next course of loops, wherein the next course of loops extends above the structure being printed and may function as an existing course of loops for subsequent knitting steps. The method includes repeating the knitting and printing steps to create an internal woven reinforcement network within the printed part until the part is completed. The starter piece and the course of loops extending from the second end of the completed part are engaged and heated to a temperature where the material is flowable. The reinforcement network is then placed into tension by applying a force to pull the starter piece and the course of loops in opposite directions from each other. The part is cooled to a temperature where the thermoplastic material solidifies such that the internal woven structure remains in tension.

23 Claims, 7 Drawing Sheets (51) Int. Cl.
*B29C 64/209* (2017.01)
*B29C 48/92* (2019.01)
*B29C 64/106* (2017.01)
*B33Y 70/00* (2020.01)
*B33Y 40/00* (2020.01)
*B33Y 30/00* (2015.01)

(52) U.S. Cl.
CPC ............ *B29C 48/92* (2019.02); *B29C 64/106* (2017.08); *B33Y 30/00* (2014.12); *B33Y 40/00* (2014.12); *B33Y 70/00* (2014.12)

(56) References Cited

U.S. PATENT DOCUMENTS

| | | |
|---|---|---|
| 6,054,077 A | 4/2000 | Comb et al. |
| 6,547,995 B1 | 4/2003 | Comb |
| 6,814,907 B1 | 11/2004 | Comb |
| 7,384,255 B2 | 6/2008 | LaBossiere et al. |
| 7,604,470 B2 | 10/2009 | LaBossiere et al. |
| 7,625,200 B2 | 12/2009 | Leavitt |
| 7,896,209 B2 | 3/2011 | Batchelder et al. |
| 8,153,182 B2 | 4/2012 | Comb et al. |
| 2017/0129153 A1* | 5/2017 | Koivuharju ............ B29C 48/16 |

* cited by examiner

METHOD OF PRINTING PARTS IN A LAYERWISE MANNER WITH ONE OR MORE INTERNAL WOVEN PANELS UNDER TENSION

BACKGROUND

The present disclosure relates to the printing of parts utilizing an extrusion-based additive manufacturing process. More particularly, the present disclosure relates to the printing of parts using an extrusion-based additive manufacturing system having a knitted reinforcement network that spans a plurality of layers as the part is printed. All references disclosed herein are incorporated by reference.

Additive manufacturing, also called 3D printing, is generally a process in which a three-dimensional (3D) object is built by adding material to form a 3D part rather than subtracting material as in traditional machining. Using one or more additive manufacturing techniques, a three-dimensional solid object of virtually any shape can be printed from a digital model of the object by an additive manufacturing system, commonly referred to as a 3D printer. A typical additive manufacturing work flow includes slicing a three-dimensional computer model into thin cross sections defining a series of layers, translating the result into two-dimensional position data, and feeding the data to a 3D printer which manufactures a three-dimensional structure in an additive build style. Additive manufacturing entails many different approaches to the method of fabrication, including material extrusion, ink jetting, selective laser sintering, powder/binder jetting, electron-beam melting, electrophotographic imaging, and stereolithographic processes.

In a typical extrusion-based additive manufacturing system (e.g., fused deposition modeling systems developed by Stratasys, Inc., Eden Prairie, Minn.), a 3D object may be printed from a digital representation of the printed part by extruding a viscous, flowable thermoplastic or filled thermoplastic material from a print head along toolpaths at a controlled extrusion rate. The extruded flow of material is deposited as a sequence of roads onto a substrate, where it fuses to previously deposited material and solidifies upon a drop in temperature. The print head includes a liquefier which receives a supply of the thermoplastic material in the form of a flexible filament, and a nozzle tip for dispensing molten material. A filament drive mechanism engages the filament such as with a drive wheel and a bearing surface, or pair of toothed-wheels, and feeds the filament into the liquefier where the filament is melted. The unmelted portion of the filament essentially fills a diameter of the liquefier tube, providing a plug-flow type pumping action to extrude the molten filament material further downstream in the liquefier, from the tip to print a part, to form a continuous flow or toolpath of resin material. The extrusion rate is unthrottled and is based only on the feed rate of filament into the liquefier, and the filament is advanced at a feed rate calculated to achieve a targeted extrusion rate, such as is disclosed in Comb U.S. Pat. No. 6,547,995.

In a system where the material is deposited in planar layers, the position of the print head relative to the substrate is incremented along an axis (substantially perpendicular to the build plane) after each layer is formed, and the process is then repeated to form a printed part resembling the digital representation. In fabricating printed parts by depositing layers of a part material, supporting layers or structures are typically built underneath overhanging portions or in cavities of printed parts under construction, which are not supported by the part material itself. A support structure may be built utilizing the same deposition techniques by which the part material is deposited. A host computer generates additional geometry acting as a support structure for the overhanging or free-space segments of the printed part being formed. Support material is then deposited pursuant to the generated geometry during the printing process. The support material adheres to the part material during fabrication, and is removable from the completed printed part when the printing process is complete. The print plane can be substantially horizontal, substantially vertical and/or any angle between horizontal and vertical.

A multi-axis additive manufacturing system may be utilized to print 3D parts using fused deposition modeling techniques. The multi-axis system may include a robotic arm movable in six degrees of freedom. The multi-axis system may also include a build platform movable in two or more degrees of freedom and independent of the movement of the robotic arm to position the 3D part being built to counteract effects of gravity based upon part geometry. An extruder may be mounted at an end of the robotic arm and may be configured to extrude material with a plurality of flow rates, wherein movement of the robotic arm and the build platform are synchronized with the flow rate of the extruded material to build the 3D part. The multiple axes of motion can utilize complex tool paths for printing 3D parts, including single continuous 3D tool paths for up to an entire part, or multiple 3D tool paths configured to build a single part. Use of 3D tool paths can reduce issues with traditional planar toolpath 3D printing, such as stair-stepping (layer aliasing), seams, the requirement for supports, and the like. Without a requirement to slice a part to be built into multiple layers each printed in the same build plane, the geometry of the part may be used to determine the orientation of printing.

When parts are printed in a layer-wise manner utilizing thermoplastics, the parts exhibit consistent strength in the print plane (commonly referred to as the x-y plane) because roads of molten materials bond together and then solidify upon a drop in temperature. However, the printed parts experience lesser strength between layers (commonly referred to as the z direction) because a molten material typically has to bond to a previously solidified material. There remains a need for techniques that can be used to increase the z-strength between layers when printing parts in a fused deposition modeling process.

SUMMARY

An aspect of the present disclosure is directed to a method of producing a part printed in a layer-wise manner. The method includes providing a pre-fabricated starter piece with a first course of loops and printing a layer of a part by extruding one or more flowable thermoplastic materials about the existing course of loops such that an upper surface of the layer is at a selected height on the existing course of loops. The method includes knitting a next course of loops to the existing course of loops to form a portion of an internal woven reinforcement network, and printing a next layer of the part by extruding one or more flowable thermoplastic materials about the next course of loops such that an upper surface of the next layer is at a selected height on the next course of loops, wherein the next course of loops extends above the structure being printed and may function as an existing course of loops for subsequent knitting steps. The method includes repeating the knitting and printing steps to create an internal woven reinforcement network within the printed part until the part is completed. The starter piece and the course of loops extending from the second end of the completed part are engaged, the completed part is heated to a temperature where the material is flowable, and a force is applied to pull the starter piece and the course of loops in opposite directions from each other, thereby placing the internal woven reinforcement network into tension. The part is cooled to a temperature where the thermoplastic material solidifies such that the internal woven structure remains in tension.

Another aspect of the present disclosure relates to a method of producing a part printed in a layer-wise manner. The part can be printed with one or more materials that are flowable when heated to a selected temperature. The method includes providing a pre-fabricated starter piece with a first course of loops and printing a layer of a part by extruding one or more materials heated to a flowable temperature about the existing course of loops such that an upper surface of the layer is at a selected height on the existing course of loops. The method includes knitting a next course of loops to the existing course of loops to form a portion of an internal woven reinforcement network, and printing a next layer of the part by extruding one or more materials heated to a flowable temperature about the next course of loops such that an upper surface of the next layer is at a selected height on the next course of loops, wherein the next course of loops extends above the structure being printed and may function as an existing course of loops for subsequent knitting steps. The method includes repeating the knitting and printing steps to create an internal woven reinforcement network within the printed part until the part is completed. The starter piece and the course of loops extending from the second end of the completed part are engaged, the completed part is heated to a temperature where the material is flowable, and a force is applied to pull the starter piece and the course of loops in opposite directions from each other, thereby placing the internal woven reinforcement network into tension. The part is cooled to a temperature where the material solidifies such that the internal woven structure remains in tension.

DETAILED DESCRIPTION

The present disclosure is directed to a device and method for printing a part utilizing an extrusion-based additive manufacturing system along with a weaving or knitting device to knit one or more looped networks or panels as the part is printed in a layer-wise manner. The looped panel(s) or internal woven reinforcement networks is located in and between the layers (interlayer) as the part is printed. Because the internal woven reinforcement network is positioned through the layers, the part has increased strength in a direction (z direction) substantially normal to the printed layers. The part can be printed using one or more thermoplastic materials or other materials that are flowable when heated to a selected temperature.

The internal woven reinforcement network(s) is knitted or constructed as the part is printed in the layer-by-layer manner to prevent the internal woven reinforcement network(s) from interfering with the movement of the print head during the printing operation. Constructing a woven panel concurrently with printing a part rather than printing about a pre-fabricated woven panel averts having to move a complete panel out of the way of a print head so that it avoids interference with the printing of a layer of the part and/or support structure.

The present disclosure including the knitting of courses of a reinforcing network or structure as the part is printed in a layer-wise manner. The present disclosure includes knitting looped courses while the part is printed such that a selected number of looped courses extend above the upper surface of the part. Controlling the length of the internal woven reinforcement network above the upper surface of the part being printed allows the location of the material to be manipulated to prevent interference with the print head during the printing of layers of the part while also providing access to an upper course of the internal woven reinforcement network such that additional courses can be knitted as the part is printed. The courses can be knitted as the part is printed such that the internal woven reinforcement network extends from proximate a bottom layer of the part to proximate a top layer of the part. Because the internal woven reinforcement network extends through the layers of the part, the internal woven reinforcement network increases the strength of the part in a direction substantially normal to the printed layers relative to parts printed without the knitted structure.

Figure 1:
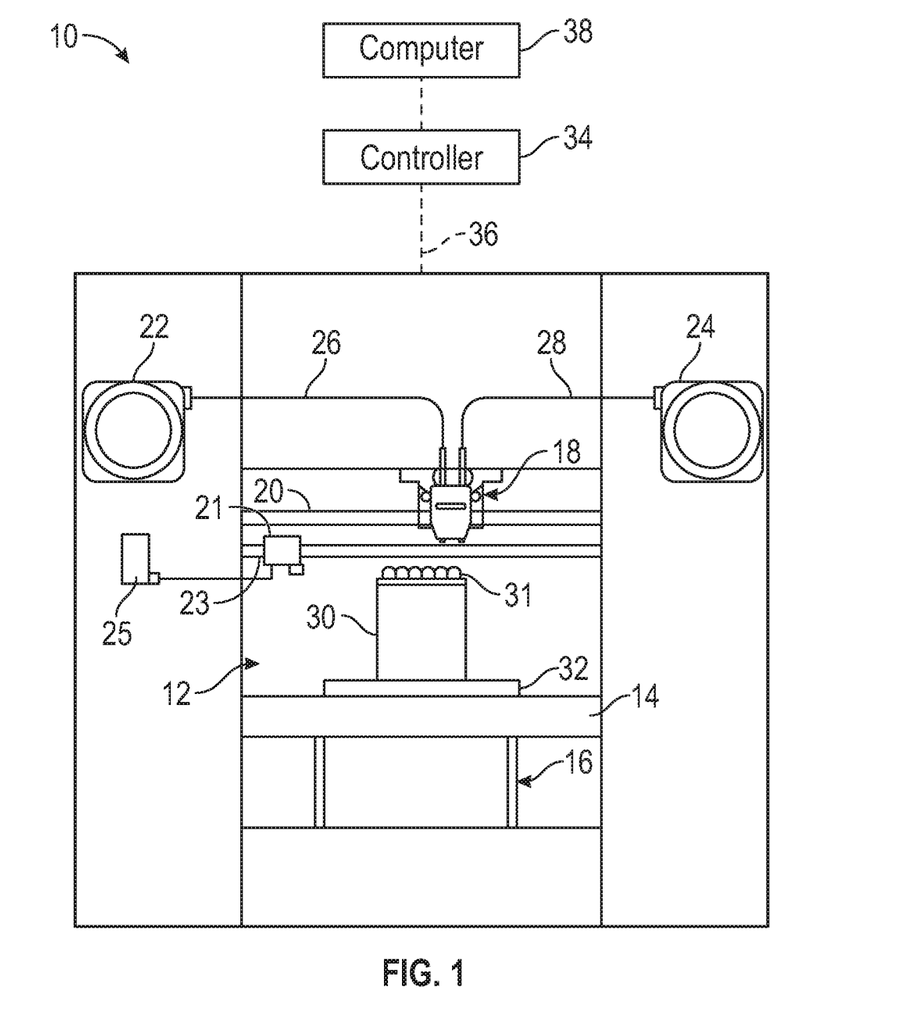
FIG. 1 is a front view of an additive manufacturing system configured to print parts with one or more internal woven reinforcement networks.

FIG. 1 is a schematic front view of an exemplary additive manufacturing system 10. As shown in FIG. 1, system 10 is an extrusion-based additive manufacturing system for printing or otherwise building 3D parts and support structures using a layer-based, additive manufacturing technique, where the 3D part can be printed from part material and support structures can be printed from support material. Suitable extrusion-based additive manufacturing systems for system 10 include fused deposition modeling systems developed by Stratasys, Inc., Eden Prairie, Minn. under the trademark "FDM".

In the illustrated embodiment, system 10 includes chamber 12, platen 14, platen gantry 16, print head 18, head gantry 20, and consumable assemblies 22 and 24. Chamber 12 is an enclosed environment that contains platen 14 and any printed objects. Chamber 12 can be heated (e.g., with circulating heated air) to reduce the rate at which the part and support materials solidify after being extruded and deposited. In alternative embodiments, chamber 12 can be omitted and/or replaced with different types of build environments. For example, parts can be built in a build environment that is open to ambient conditions or may be enclosed with alternative structures (e.g., flexible curtains).

The system 10 includes knitting mechanism 21 that is carried by a knitting mechanism gantry 23 and a supply of material 25 that provides material to the knitting device 21 such that an interlayer structure 31 can be knitted as the part is printed. A second, knitting mechanism gantry 23 is utilized to reduce the mass carried by the head gantry 20. However, it is within the scope of the present disclosure for the head gantry 20 to carry the print head(s) 18 and the knitting mechanism 21.

Platen 14 is a platform on which printed parts and support structures are printed in a layer-by-layer manner. In some embodiments, platen 14 may also include a flexible polymeric film or liner on which the printed parts and support structures are printed. In the illustrated example, print head 18 is a dual-tip extrusion head configured to receive consumable filaments from consumable assemblies 22 and 24 (e.g., via feed tube assemblies 26 and 28) for printing part 30 and support structure 32 on platen 14. Consumable assembly 22 may contain a supply of a part material, such as a high-performance part material, for printing printed part 30 from the part material. Consumable assembly 24 may contain a supply of a support material for printing support structure 32 from the given support material.

Platen 14 is supported by platen gantry 16, which is a gantry assembly configured to move platen 14 along (or substantially along) a vertical z-axis. Correspondingly, print head 18 is supported by head gantry 20, which is a gantry assembly configured to move print head 18 in (or substantially in) a horizontal x-y plane above chamber 12. In an alternative embodiment, platen 14 may be configured to move in the horizontal x-y plane within chamber 12 and print head 18 may be configured to move along the z-axis. Other similar arrangements may also be used such that one or both of platen 14 and print head 18 are moveable relative to each other over a desired number of degrees of freedom. Platen 14 and print head 18 may also be oriented along different axes. For example, platen 14 may be oriented vertically and print head 18 may print part 30 and support structure 32 along the x-axis or the y-axis.

The print head 18 can have any suitable configuration. Examples of suitable devices for print head 18, and the connections between print head 18 and head gantry 20 include those disclosed in Crump et al., U.S. Pat. No. 5,503,785; Swanson et al., U.S. Pat. No. 6,004,124; LaBoissiere, et al., U.S. Pat. Nos. 7,384,255 and 7,604,470; Leavitt, U.S. Pat. No. 7,625,200; Batchelder et al., U.S. Pat. No. 7,896,209; Comb et al., U.S. Pat. No. 8,153,182; Leavitt, U.S. Pat. No. 7,625,200; and Swanson et al., U.S. Pat. Nos. 8,419,996 and 8,647,102.

System 10 also includes controller 34, which can include one or more control circuits configured to monitor and operate the components of system 10. For example, one or more of the control functions performed by controller 34 can be implemented in hardware, software, firmware, and the like, or a combination thereof. Controller 34 can communicate over communication line 36 with chamber 12 (e.g., with a heating unit for chamber 12), print head 18, knitting mechanism 21 and various sensors, calibration devices, display devices, and/or user input devices.

System 12 and/or controller 34 can also communicate with computer 38, which can include one or more discrete computer-based systems that communicate with system 12 and/or controller 34, and may be separate from system 12, or alternatively may be an internal component of system 12. Computer 38 includes computer-based hardware, such as data storage devices, processors, memory modules, and the like for generating and storing tool path and related printing instructions. Computer 38 may transmit these instructions to system 10 (e.g., to controller 34) to perform printing operations.

A digital model representative of a 3D part to be printed can be created, such as by scanning an existing 3D object to create a digital image file, or such as by drawing a 3D part using a computer-aided design (CAD) program. The regions of the digital model that are to be fiber reinforced are divided into regions of low curvature. The internal woven reinforcement networks are typically normal to the sliced layers, but can be at an angle relative to the sliced layers. The internal woven reinforcement networks can be utilized for radial and axial tensile loading. The part is sliced and prepared for additive fabrication more-or-less as usual. However, the sliced layers include gap(s) corresponding to the location of the internal woven reinforcement network(s) within the model to allow the layer to be printed without interference from the internal woven reinforcement network and to account for the volume of the internal woven reinforcement network(s) within the part.

The digital model and/or instructions for printing the model can be loaded into computer 38. The computer 38 can communicate with controller 34, which serves to direct the system 10 to print the 3D part 30 and optionally, a support structure 32. Part material is deposited in layers along toolpaths that build upon one another to form the 3D part 30. As the part material is deposited to print the part 30, the knitting mechanism 21 is utilized to knit looped courses of material such that one or more looped courses extend above the surface of the upper layer of the part 30 being printed and control the location of the courses that extend above the surface of the upper layer of the part 30 being printed.

Figure 2:
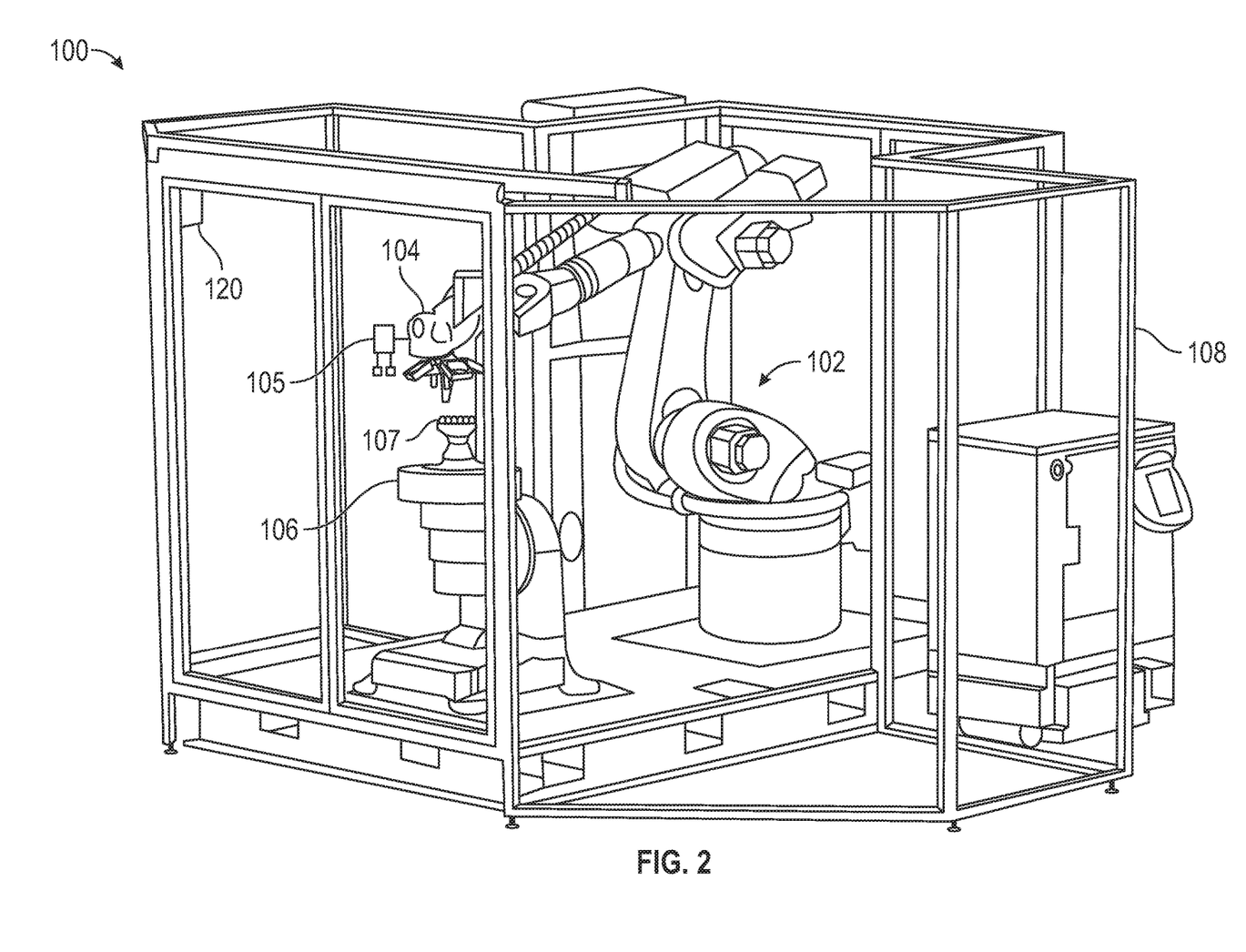
FIG. 2 is a schematic view of another additive manufacturing system configured to print parts with one or more internal woven reinforcement network.

FIG. 2 is a perspective view of a multi-axis robotic build system 100 that may be used for additive manufacturing of parts utilizing two-dimensional tool paths, three-dimensional tool paths and combinations thereof. System 100 includes in one embodiment a robotic arm 102 capable of movement along six axes. An exemplary robotic arm is an industrial robot manufactured by KUKA Robotics of Augsburg, Germany. While six axes of motion are discussed for the robotic arm 102 from a stationary base, it should be understood that additional axes or other movements are also amenable to use with the embodiments of the present disclosure, without departing therefrom. For example, the robotic arm 102 could be mounted to move on a rail or a gantry to provide additional degrees of freedom. The robotic arm 102 carries a print head 104, such as an extrusion head 104 for printing parts from a filament feedstock. The robotic arm 102 also carries a knitting mechanism 105 that knits a structure as the part is printed. A build platform 106 is provided, which in one embodiment is movable along two axes of rotation, rotation about the z-axis, and tilting (rotation) about the x-axis. A controller 108 contains software and hardware for controlling the motion of the robotic arm 102 and the build platform 106, as well as the printing operation of the print head 104.

A generated tool path is utilized to control motion of the robotic arm 102. However, control of the extrusion head is also used to accurately deposit material along the generated tool path. For example, one embodiment of the present disclosure synchronizes timing of the motion of the robotic arm 102 with print head 104 to extrusion from the print head 104. Embodiments of the present disclosure provide for speed up or slowdown of printing, changing the extrusion rate in conjunction with robotic movements, tip cleaning, tip changing, and other actions of the print head 104 based on the generated tool path and motion of the robotic arm 102 along with the knitting of the looped courses 107 with the knitting mechanism 105 as the part is being built. As an example, extrusion from the print head 104 may be synchronized with motion of the robotic arm 102 in manners taught by Comb et al. U.S. Pat. No. 6,054,077; and Comb U.S. Pat. Nos. 6,814,907, 6,547,995, and 6,814,907.

Figure 3:
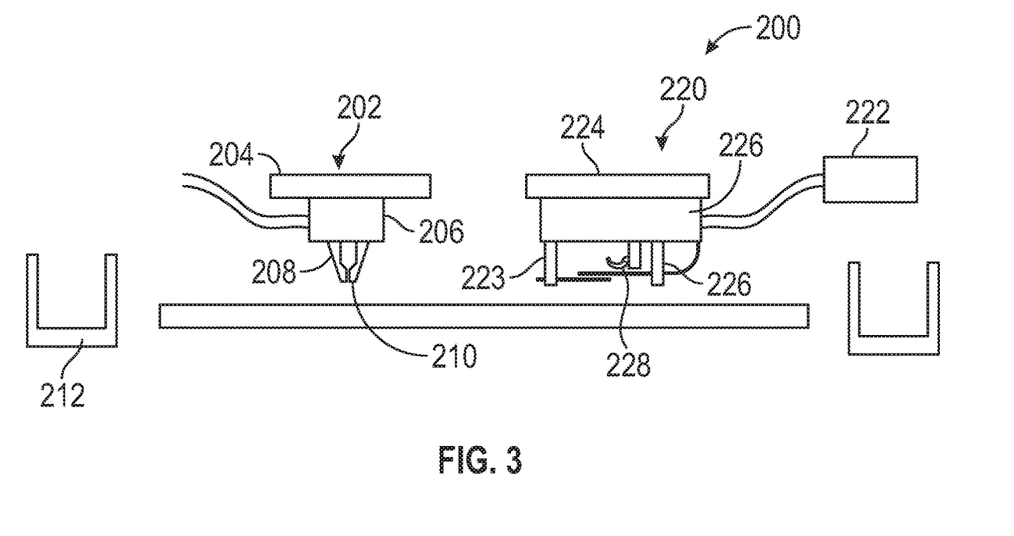
FIG. 3 is a schematic view of an extrusion system and a knitting system of an additive manufacturing system.
Figure 4:
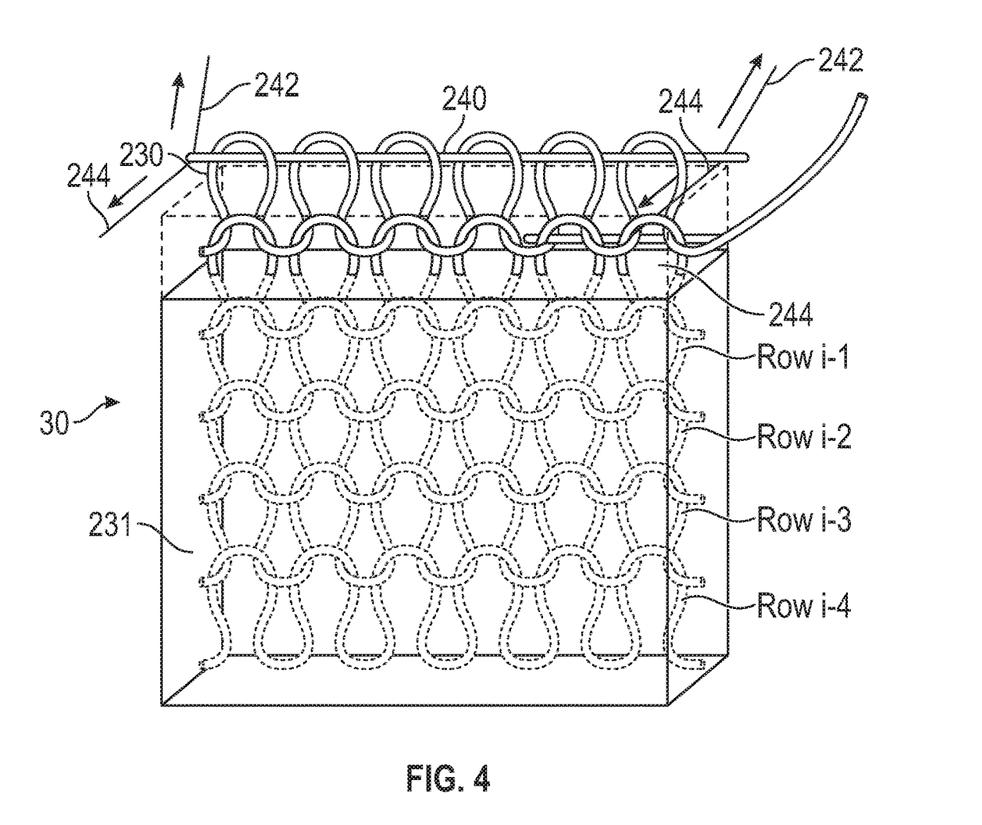
FIG. 4 is a view of part being printed along with the knitting of an internal woven reinforcement network.

An exemplary combination extrusion and knitting system is illustrated at 200 in FIG. 3 and an exemplary part 30 being printed with an internal woven reinforcement network is illustrated in FIG. 4. The system 200 includes an extrusion system 202 and a knitting system 220 that move and operate independent of each other to print a part in a layer-by-layer manner with one or more internal woven reinforcement networks extending from proximate a bottom layer to proximate a top layer of the part.

The extrusion system 202 includes a x-y gantry 204 that moves a print head 206 in a x-y plane based upon tool paths that are generated for sliced layers, as discussed above. The print head 206 drives a source of part or support material into a liquefier tube 208 where the material is heated to a molten state and is extruded through a nozzle 210 in a series of roads based upon the generated tool paths. In some embodiments, the system includes a purge bucket 212 to dispose of material from the nozzle 210 when extrusion is being started and/or stopped.

The knitting system 220 includes a source 222 of tow material that is suppled to a knitting head 226 that is carried by a second x-y gantry 224, although the knitting system may share the same gantry as is used for the extrusion system 202. Non-limiting exemplary materials that can be utilized to knit a internal woven reinforcement network include carbon fiber, fiberglass rope and metal cable or wire. The knitting head 224 includes a feeding device 226 that is utilized to feed a tow material through a prior course of loops of an internal woven reinforcement network being knitted.

A starter row is inserted proximate a bottom layer of the part being printed. Non-limiting examples of the starter row (row i–1 in FIG. 4) include a pre-formed starter piece including loops, with a carbon tow hot-staked into the part and/or a tow of a steel wire. A pulling device 227 pulls the tow material proximate the prior course of loops or the starter piece. Once the tow material is positioned proximate the prior formed course of loops (i+1 in FIG. 4), a hooking device 228 engages the tow proximate the loops, and pulls the tow towards the second x-y gantry 224 to form a next course of loops (i+2 in FIG. 4). The movement of the hooking device 228 is controlled by an actuator such as a servo motor, such that the tow material can be formed into the looped course (i+2 in FIG. 4).

In some instances, the ends of the row of course of tow material can be cut if desired, or the rows can utilize a continuous length of tow from one row to the next. The cut ends of the tow can be clamped, knotted, glued, or woven into the fabric. In some instances, the cut ends of the tow material can be positioned within the extruded material such that when the extruded material solidifies, the ends are retained therein.

A final course of loops may be secured with a sufficiently rigid member and a cutter on the pulling device 226 to optionally cut the tow such that a cut end can be secured to the internal woven reinforcement network or within the previously printed layer. During fabrication of the layers, the number of loops in any particular row can be increased or decreased at the ends of the row.

Further, the courses can be woven to provide a finished edge on each row that does not require a capturing mechanism. Knitting a finished edge, such as by crocheting, may be beneficial, especially for a finishing row.

Referring to FIG. 4, as the next course of loops 230 is formed by the hooking device 228, a sufficiently rigid member 240 is positioned into the course of loops 230 where the sufficiently rigid member 240 is secured to cables 242, 244 that are configured to move the sufficiently rigid member 240 and therefore the course of loops 230 as the part 30 is printed. While cables 242, 244 are illustrated and described, other actuating devices are also within the scope of the present disclosure.

What is meant by a sufficiently rigid member is that depending upon the desired function, the member can be flexible or rigid. For instance, when the member 240 is used to control the location of the loops and not place loops into tension, then a flexible member such as a wire would be sufficient. However, when the interlayer reinforcement network is to be place into tension, then a rigid member can be utilized to retain the interlayer reinforcement network in tension.

Figure 5A:
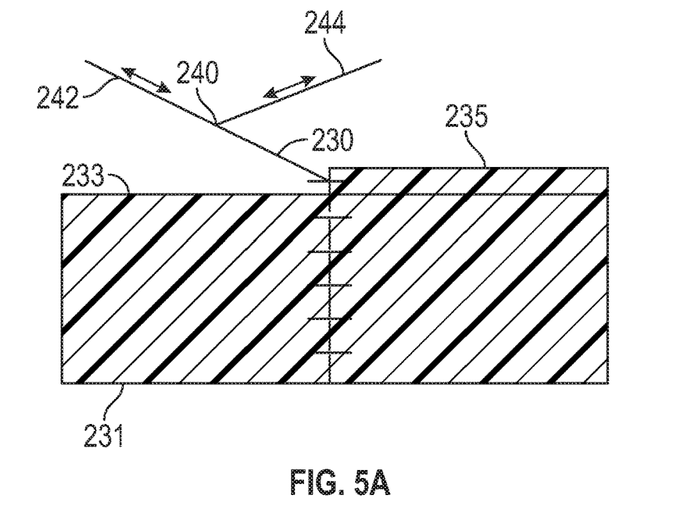
FIG. 5A is a schematic view of a part and external portion of an internal woven reinforcement network in a first position.
Figure 5B:
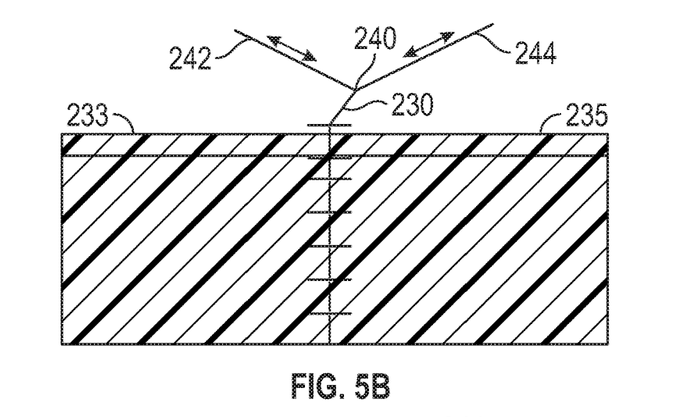
FIG. 5B is a schematic view of a part and external portion of an internal woven reinforcement network in a second position.
Figure 5C:
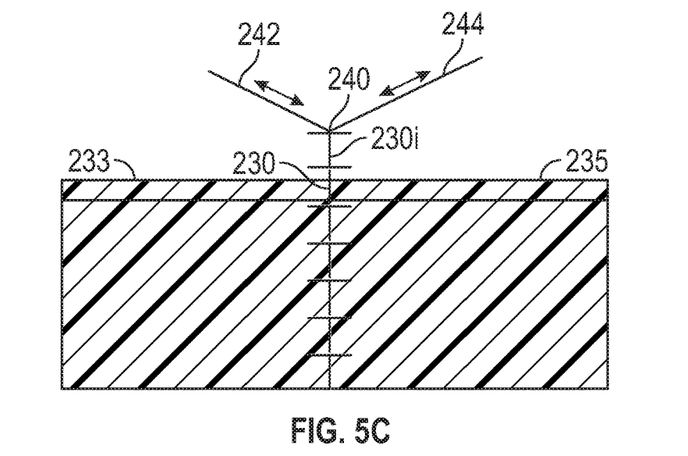
FIG. 5C is a schematic view of a top course of loops knitted into an internal woven reinforcement network above a top surface of a part being printed.

Referring to FIGS. 5A-C, the courses of loops 230 that extend above the upper surface of the part being printed are manipulated to allow the print head 206 to print the layer without interference from the courses. Referring to FIG. 5A, the cables 242 and 244 move the courses to the left portion of the part while the right portion of the layer is printed. Once the right portion of the part is printed, the cables 242 and 244 are manipulated to the right and over the previously printed portion of the layer such that left portion of the layer can be printed as illustrated in FIG. 5B.

The layers are printed with thin gaps proximate the location of the internal woven reinforcement network such that the internal woven reinforcement network does not interfere with the print head. The gaps compensate for the volume of the internal woven reinforcement network such that excessive material is prevented from being extruded, which would result in printing errors. However, the gaps are sufficiently thin to allow molten material to fill in the gap and about the internal woven reinforcement network, such that that a solid layer is of part is printed.

The courses of loops 230 are manipulated as the layers are printed as illustrated in FIGS. 5A and 5B until the part reaches a selected height on the courses of loops 230. Once the selected height is reached, the print head 206 is moved to a selected location, such that the cables 242 and 244 can move the course of loops 230 to a selected location where the knitting system 220 can create another course of loops 230i. In some instances, the sufficiently rigid member of the previously knitted course is retained in the part being printed. In other instances, the sufficiently rigid member of the previously knitted course is removed from the course as the part is printed.

Once the next course of loops 230*i* is formed, another sufficiently rigid member 240 is positioned through the course of loops 230*i* and cables 242 and 244 are attached the sufficiently rigid member 240 such that the cables 242 and 244 as illustrated in FIG. 5C.

The sufficiently rigid member 240 and cables 242 and 244 can then be used to manipulate the course of loops 230, 230*i* above the upper surface of the part as the layers are printed as illustrated in FIGS. 5A and 5B. Once the part is printed on the courses, the next course of loops 230*i*+1 is then woven as illustrated in FIG. 5C. The process is repeated until the part is printed with the 3D printer.

Referring to FIGS. 6 and 7A-7C, a tennis racquet 300 is illustrated with substantially parallel internal woven internal woven reinforcement networks 302 and 304 extending from the proximate a bottom end to a top end where the internal woven reinforcement networks 302 and 304 provide additional strength to the printed racquet 300. The internal woven reinforcement networks 302 and 304 can be woven with the knitting system 220. However, the internal woven reinforcement networks 302 and 304 are independently manipulated using sufficiently rigid members 310 and 312 positioned through the upper courses 306 and 308. Cables 314 are connected to the sufficiently rigid member 310 and cables 316 are connected to the sufficiently rigid member 312 such that the cables 314 and 316 can be manipulated which causes the courses 306 and 308 to move to positions that do not interfere with the printing of the layer(s).

Figure 6:
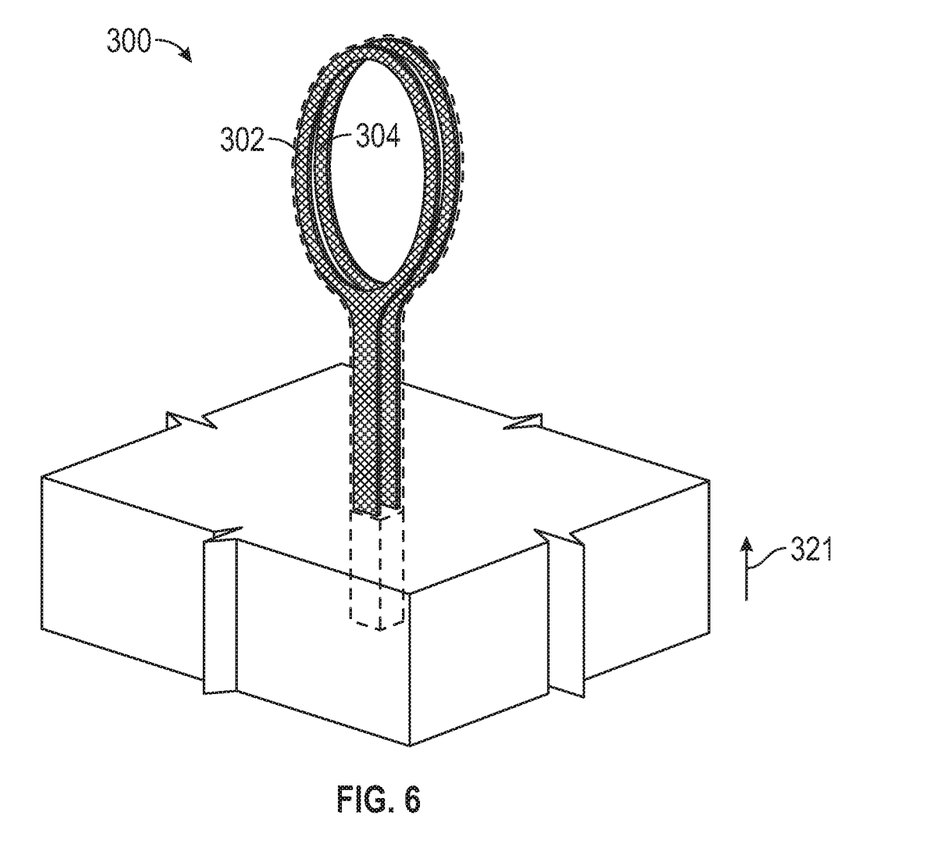
FIG. 6 is a view of a racquet having two internal woven reinforcement networks.
Figure 7A:
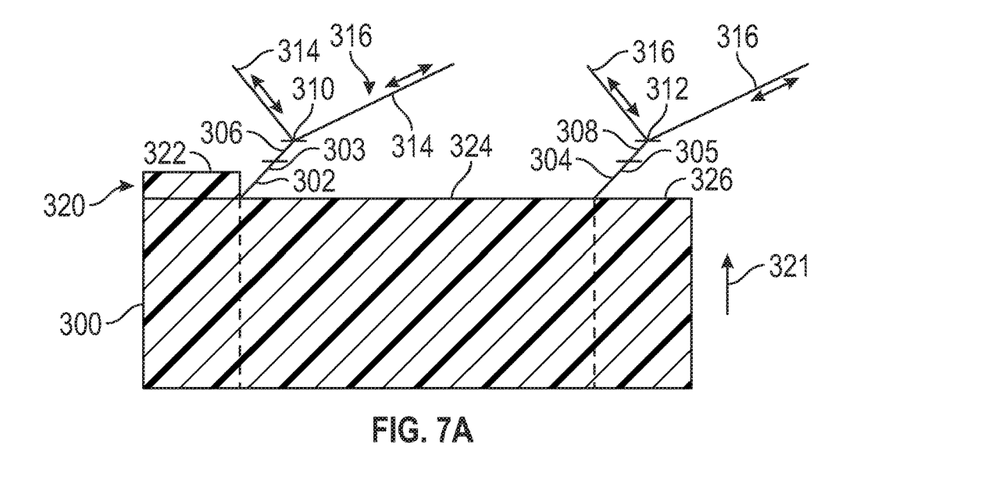
FIG. 7A is a schematic view of a portion of the handle of the racquet of FIG. 6 being printed with external portions of two internal woven reinforcement networks in a first position.
Figure 7B:
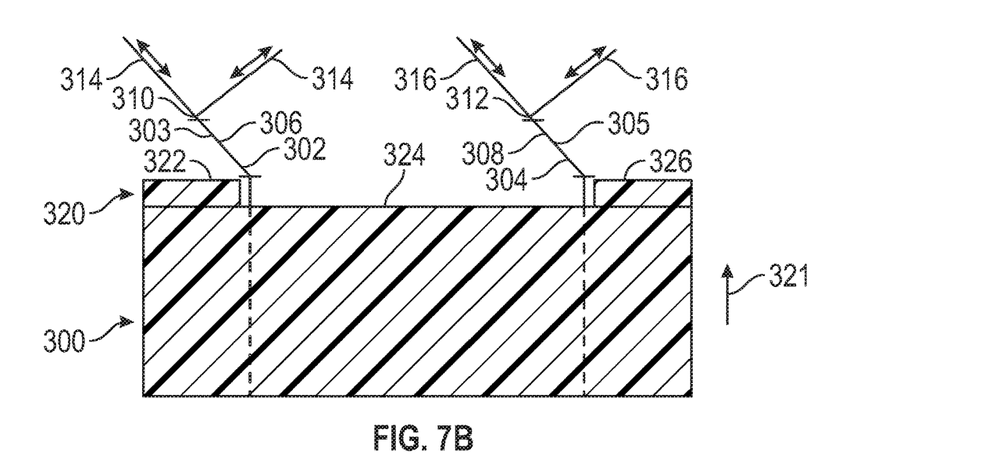
FIG. 7B is a schematic view of the portion of the handle of the racquet of FIG. 6 being printed a part with external portion of two internal woven reinforcement networks in a second position.
Figure 7C:
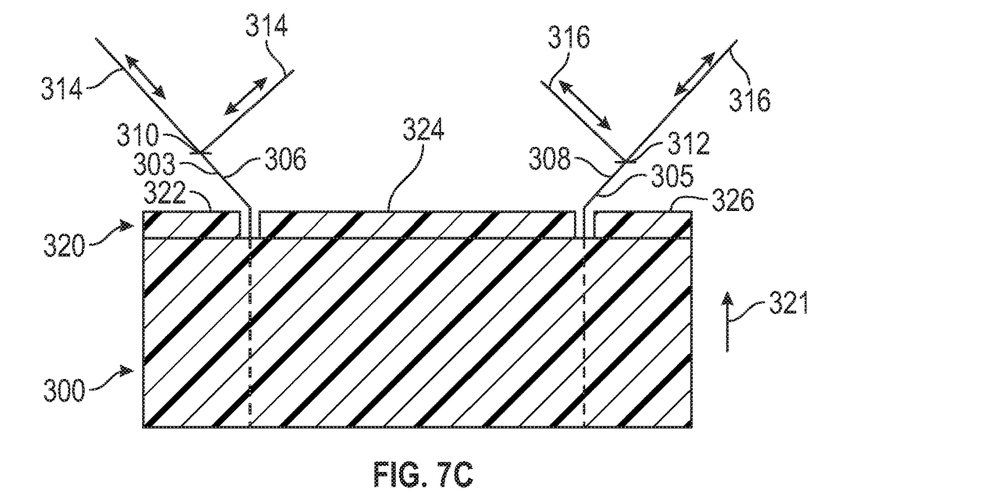
FIG. 7C is a schematic view of the portion of the handle of the racquet of FIG. 6 being printed a part with external portion of two internal woven reinforcement networks in a third position.

FIGS. 7A-7C illustrate a portion of the tennis racquet handle being printed, as indicated in FIG. 6. The layer 320 of the tennis racquet handle printed in the direction of arrow 312 has three sections, a front section 322, a middle section 324 between the internal woven reinforcement networks 302 and 304, and a back section 326. FIG. 7A illustrates the courses 303 and 305 of the internal woven reinforcement networks 302 and 304, respectively, above the upper surface of the part being printed positioned away from the front portion 322 such that the print head 206 can print the front portion of the layer. FIG. 7B illustrates the course 306 of the internal woven reinforcement networks 302 position over the printed front section 322 and the course 308 of the internal woven reinforcement networks 304 positioned over the middle section 324, which allows the back section 326 to be printed. FIG. 7C illustrates the course 308 of the internal woven reinforcement networks 304 over the back section 326 and the course 306 of the internal woven reinforcement networks 302 over the front section 322 which allows the print head 206 to print the middle section 324.

The printing process is repeated in a layer-wise manner until the part reaches a selected height. Once the part is at a selected height, another course 306 and 308 is knitted to extend the internal woven reinforcement networks 302 and 304, respectively above the part. With the additional course 306 and 308 added to the internal woven reinforcement networks 302 and 304, additional layers are printed as previously discussed until the part is completely printed.

Figure 8:
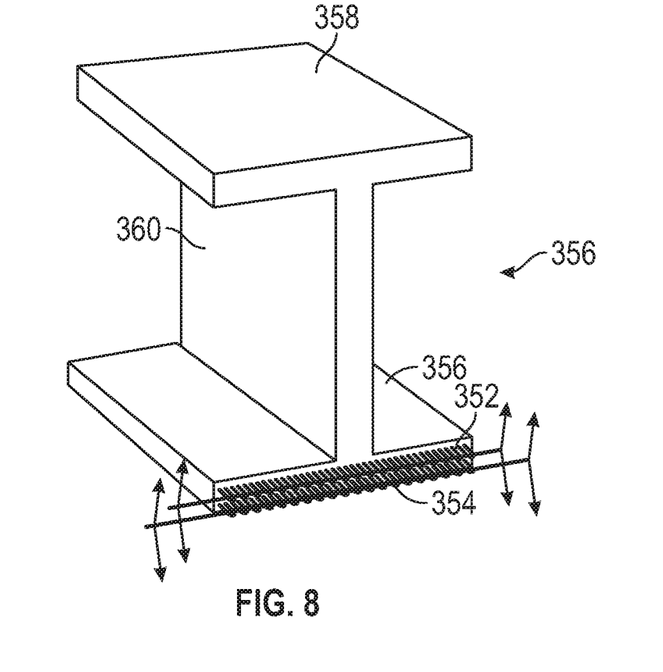
FIG. 8 is a view of an I-beam with two internal woven reinforcement networks in a bottom flange.

Referring to FIG. 8, an I-beam 350 is illustrated with knitted internal woven reinforcement networks 352 and 354 within a lower flange 356 while the upper flange 358 and the web 360 are printed without an internal woven reinforcement network. The lower flange 356 includes the internal woven reinforcement networks 352 and 354 to prevent the I-beam from flexing when a force is placed on the upper flange 358. The lower flange 356 is printed in the manner described and illustrated in FIGS. 7A-7C.

While the I-beam 350 with the internal woven reinforcement networks 352 and 354 within the lower flange 356 is illustrated, many parts can be printed with areas of selective reinforcement by weaving or knitting the internal woven reinforcement networks to provide additional strength to the part where desired. Further, while two internal woven reinforcement networks 352 and 354 are illustrated, any number of internal woven reinforcement networks can be printed in a part and/or a selected region of a part to provide additional strength. The incorporation of the internal woven reinforcement network within a thermoplastic structure provides additional rigidity and strength, closer to that of a structure fabricated from metal, with the lightweight advantage of thermoplastic material.

The internal woven reinforcement networks that are knitted with the internal reinforcement network are slack and not under tension, which provides interlayer strength. However, the strength of the part will be dictated by the strength of the thermoplastic material being used to print the part in the layer-wise manner. If the internal woven reinforcement network(s) is placed in tension, then the strength of the part will be dictated by the strength of the material used to knit the internal woven reinforcement network, instead of the thermoplastic material. For instance, when an internal woven reinforcement network of carbon fiber or metal wire are utilized and placed under tension within the thermoplastic part, the part will have the strength of the carbon fiber or metal wire.

To place an entire internal woven reinforcement network(s) under tension at once, a fixture or bottom course extending from one end of the part is secured a tensioning device or a static member. A fixture or top course of the internal woven reinforcement network extending from the other end of the part is secured to a tensioning device or a static member. Retaining members or jigs are placed proximate the ends of the part and about the courses or fixtures. The part is then heated to a temperature above the glass transition temperature, which allows the polymeric material to flow.

Tension is then placed on one or both ends of the interlayer reinforcement network and because the part is at a temperature above the glass transition temperature, such that the internal woven reinforcement network(s) can move within the polymeric matrix and into a tensioned state. While the interlayer reinforcement network(s) are placed into tension, the matrix around the interlayer reinforcement network(s) will tend to move with the interlayer reinforcement network(s), as it is placed into tension which can result in an elongated or deformed part. The retaining members or jigs counter the tensile forces placed on the interlayer reinforcement network, and retain the shape of the part.

Once the interlayer reinforcement network(s) is under the desire amount of tensile force, the part is cooled to a temperature below the glass transition temperature. When the part is below the glass transition temperature, the polymeric matrix is fixed and does not flow, which retains the internal woven reinforcement network(s) under tension and provides the part with the strength of the woven or knitted material.

When the part is sufficiently cooled, the tensioning device is removed from the interlayer reinforcement network(s). The portions of the interlayer reinforcement network(s) can be optionally trimmed to be substantially even with the surfaces of the part to provide a finished appearance to the part. In some embodiments where a pre-fabricated starter piece is utilized, the starter piece is also removed from the cooled parts. In some embodiments, the external portion of the reinforcement network can be covered with additional materials to provide a finished appearance. In other embodiments the part can be cut on each end to provide a part with a selected length with a finished appearance.

As discussed above, the reinforcement networks provided added strength to a printed part in the z-direction. Additionally, the loops extending from the printed part can be utilized to combine or attach two or more components of a part by connecting the exposed loops of two or more components. In one embodiment a bobbin of tow material is woven through both courses of loops and then the tow material is pulled tight, which secures the two or more components together.

In some embodiments, securing the components together with the tow material is sufficient. In other embodiments, the tow material is used with another securing mechanism, such as a glue, adhesive or the printing of more material. Being able to secure components together allows parts to be printed that are larger than the printing capacity of a single extrusion based additive manufacturing system.

EXAMPLES

The present disclosure is more particularly described in the following examples that are intended as illustrations only, since numerous modifications and variations within the scope of the present disclosure will be apparent to those skilled in the art.

Example 1

An I-beam is printed with woven interlayer reinforcement networks in a lower flange of the beam that increases the strength of the I-beam, as follows. The I-beam is twice as tall as it is wide (W). Assume that the beams are L=25 feet long, and that the I-beam bows H under F=6,000 lbf loading (each, giving a 4× margin). The thickness of the flanges and web are W/10. The moment for beam bending is $$I = \frac{2W^4}{3} \qquad \text{(Equation 1)}$$

the moduli $E_i$ of the two plates are $E_{top}$ and $E_{bot}$. If the weight is concentrated in the center, and both ends are simply supported, the center deflection is $$H = \frac{FL^3}{32 E_i W^4} \qquad \text{(Equation 2)}$$

Assuming the I-beam is printed with ABS, the compressive strength of ABS is 9,400 psi, and the compressive modulus is 0.35 Mpsi. For a deflection of 4", the width of the top plate needs to be 7.7" (and the height of the beam is 15"). The flanges and web are all 0.4" thick.

The tensile modulus of carbon tow is about 600,00 psi, or about 70× the compressive modulus of ABS. The lower flange could be thinner, if a higher fill ratio is possible. However, a 5 volume percent fill with tow is more than adequate. Limited primarily by the compressive modulus of ABS, the weight of each beam is 120 lb.

Using an example where the knitting technique produces 2" high loops, a 25 foot beam would include about 150 knitted rows. Using a convention FDM additive manufacturing system, the 120 lb I-beam will take several days to print, with the knitting rate being about 2 courses of loops in an hour, amongst many layers of thermoplastic.

Figure 9:
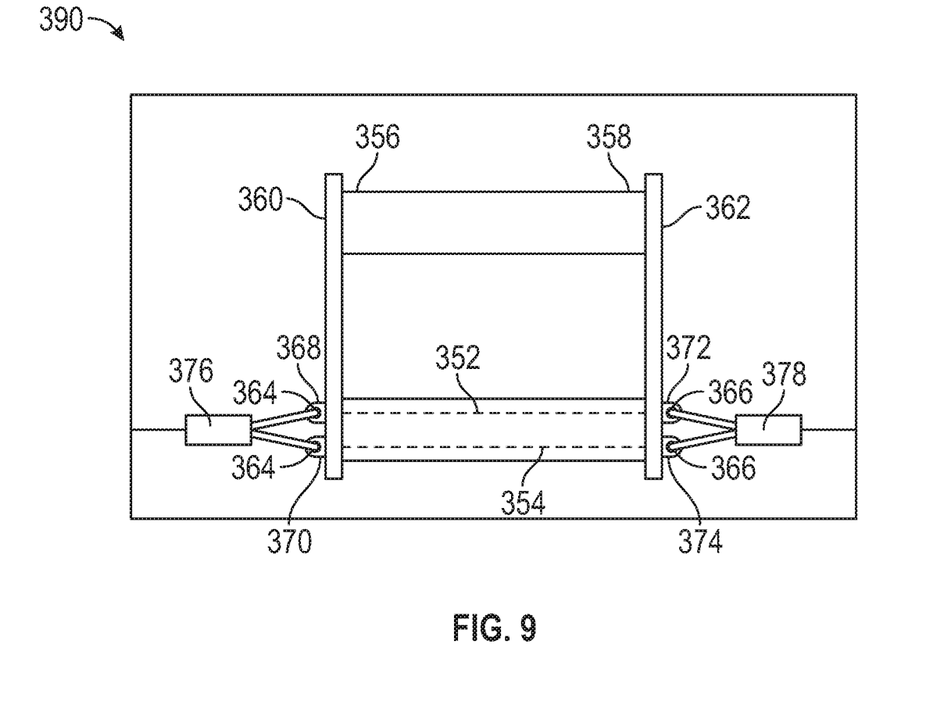
FIG. 9 is a view of an I-beam with the two internal woven reinforcement networks being placed into tension.

Referring to FIG. 9, once the I-beam 350 with the incorporated interlayer reinforcement networks 352 and 354 is printed, the I-beam 350 will not have the strength of the tow material because the loops are relatively slack. To enhance the strength of the I-beam 350, the I-beam 350 is placed in a heating chamber 390 and the interlayer reinforcement networks 352 and 354 are brought into tension using a tensioning jig 360 and 362 on opposing ends 356 and 358 and of the I-beam.

Rods 364 are placed in the courses 368, 370 extending from a first end 356 of the I-beam 350. Rods 366 are placed in the courses 372, 374 extending from a second end 358 of the I-beam 350. An actuator 376 is attached to the rods 364 and an actuator 378 is attached to the rods 366 where the actuators 376, 378 are configured to pull the rods 364, 366 apart. While two actuators are illustrated, one course of loops can be attached to a stationary structure and the other course of loops can be pulled with a rod and a single actuator.

The entire I-beam 350 is heated to 110° C. within the chamber 390 to allow the ABS material to flow/creep. The actuators 376, 378 pull the knitted interlayer reinforcement network(s) 352, 354 from both ends, until the interlayer reinforcement network(s) 352, 354 is taunt. The I-beam 350 is cooled while still tensioning the interlayer reinforcement network(s) 352, 354, to lock the interlayer reinforcement network(s) 352, 354 in place which results in the I-beam 350 having a strength relative to the strength of the woven interlayer reinforcement network material, and not that of the polymeric matrix.

Although the present disclosure has been described with reference to preferred embodiments, workers skilled in the art will recognize that changes may be made in form and detail without departing from the spirit and scope of the disclosure.

The invention claimed is:

1. A method of producing a part printed in a layer-wise manner the method comprising the steps of:
    providing a pre-fabricated starter piece with a first course of loops;
    printing a layer of a part by extruding one or more flowable thermoplastic materials about the existing course of loops such that an upper surface of the layer is at a selected height on the existing course of loops;
    knitting a next course of loops to the existing course of loops to form a portion of an internal woven reinforcement network;
    printing a next layer of the part by extruding one or more flowable thermoplastic materials about the next course of loops such that an upper surface of the next layer is at a selected height on the next course of loops, wherein the next course of loops extends above the structure being printed and may function as an existing course of loops for subsequent knitting steps;
    repeating the knitting and printing steps to create an internal woven reinforcement network within the printed part until the part is completed;
    engaging the starter piece from a first end of the completed part;
    engaging a course of loops extending from a second end of the completed part with a tensioning device;
    heating the part to a temperature where the material is flowable;
    tensioning the reinforcement network by applying a force to pull the starter piece and the tensioning device in opposite directions from each other to place the internal woven reinforcement network into tension; and cooling the part to a temperature where the thermoplastic material solidifies such that the internal woven structure remains in tension.

2. The method of claim 1, wherein the tensioning device is a rod.

3. The method of claim 1, and further comprising cutting the course of loops extending from the second end after the part is cooled to complete the printed part.

4. The method of claim 1, and further comprising removing the pre-fabricated starter piece after the part is cooled to complete the printed part.

5. The method of claim 1, wherein the printing of the part comprises printing planar layers.

6. The method of claim 1, wherein printing the part comprises printing in non-planar layers.

7. The method of claim 1, wherein printing the part comprises print in non-planar and planar layers.

8. The method of claim 1, wherein the part comprises a structural beam.

9. The method of claim 1, and further comprising covering the course of loops extending from a second end with an additional material.

10. The method of claim 1, and further comprising:
moving the existing course of loops to one or more offset locations while performing the printing step so that the next layer may be printed without interference from the portion of the internal woven reinforcement network extending above the structure being printed.

11. The method of claim 10, wherein moving the existing course of loops comprises:
inserting a sufficiently rigid member through the existing course of loops; and
moving the sufficiently rigid member with an actuator to move the existing course of loops to the one or more offset locations.

12. The method of claim 1, and further comprising:
identifying one or more locations of the structure to be reinforced with the internal woven reinforcement network; and
knitting the internal woven reinforcement network of looped courses in the identified one or more locations as the structure is printed in a layer-wise manner.

13. A method of producing a part printed in a layer-wise manner the method comprising the steps of:
providing a pre-fabricated starter piece with a first course of loops;
printing a layer of a part by extruding one or more materials heated to a flowable temperature about the existing course of loops such that an upper surface of the layer is at a selected height on the existing course of loops;
knitting a next course of loops to the existing course of loops to form a portion of an internal woven reinforcement network;
printing a next layer of the part by extruding one or more materials heated to a flowable temperature about the next course of loops such that an upper surface of the next layer is at a selected height on the next course of loops, wherein the next course of loops extends above the structure being printed and may function as an existing course of loops for subsequent knitting steps;
repeating the knitting and printing steps to create an internal woven reinforcement network within the printed part until the part is completed;
engaging the starter piece from a first end of the completed part;
engaging a course of loops extending from a second end of the completed part with a tensioning device;
heating the part to a temperature where the material is flowable;
tensioning the reinforcement network by applying a force to pull the starter piece and the tensioning device in opposite directions from each other to place the internal woven reinforcement network into tension; and
cooling the part to a temperature where the thermoplastic material solidifies such that the internal woven structure remains in tension.

14. The method of claim 13, wherein the tensioning device is a rod.

15. The method of claim 13, and further comprising cutting the course of loops extending from the second end after the part is cooled to complete the printed part.

16. The method of claim 13, and further comprising removing the pre-fabricated starter piece after the part is cooled to complete the printed part.

17. The method of claim 13, wherein the printing of the part comprises printing planar layers.

18. The method of claim 13, wherein printing the part comprises printing in non-planar layers.

19. The method of claim 13, and further comprising covering the course of loops extending from a second end with an additional material.

20. The method of claim 13, and further comprising:
moving the existing course of loops to one or more offset locations while performing the printing step so that the next layer may be printed without interference from the portion of the internal woven reinforcement network extending above the structure being printed.

21. The method of claim 20, wherein moving the existing course of loops comprises:
inserting a sufficiently rigid member through the existing course of loops; and
moving the sufficiently rigid member with an actuator to move the existing course of loops to the one or more offset locations.

22. The method of claim 13, and further comprising:
identifying one or more locations of the structure to be reinforced with the internal woven reinforcement network; and
knitting the internal woven reinforcement network of looped courses in the identified one or more locations as the structure is printed in a layer-wise manner.

23. The method of claim 13, wherein the one or more materials comprises one or more thermoplastic materials.

* * * * *